United States Patent
Cipolla et al.

(10) Patent No.: US 10,650,262 B2
(45) Date of Patent: May 12, 2020

(54) ELECTRONIC SYSTEM FOR COMPARING POSITIONS OF INTEREST ON MEDIA ITEMS

(71) Applicant: CLICPIC, INC., Abington, MA (US)

(72) Inventors: Anthony Cipolla, Quincy, MA (US); Cameron Cipolla, Quincy, MA (US); Brandon Cipolla, Quincy, MA (US)

(73) Assignee: ClicPic, Inc., Abington, MA (US)

( * ) Notice: Subject to any disclaimer, the term of this patent is extended or adjusted under 35 U.S.C. 154(b) by 0 days.

(21) Appl. No.: 15/807,817

(22) Filed: Nov. 9, 2017

(65) Prior Publication Data

US 2018/0129895 A1 May 10, 2018

Related U.S. Application Data

(60) Provisional application No. 62/419,787, filed on Nov. 9, 2016.

(51) Int. Cl.
| | |
|---|---|
| *G06K 9/20* | (2006.01) |
| *G06K 9/62* | (2006.01) |
| *G06F 16/435* | (2019.01) |
| *G06Q 50/00* | (2012.01) |
| *G06Q 10/10* | (2012.01) |
| *G06Q 30/02* | (2012.01) |
| *G06F 3/0488* | (2013.01) |
| *G06K 9/32* | (2006.01) |

(52) U.S. Cl.
CPC ......... *G06K 9/2081* (2013.01); *G06F 16/435* (2019.01); *G06K 9/6202* (2013.01); *G06Q 10/101* (2013.01); *G06Q 30/02* (2013.01); *G06Q 50/01* (2013.01); *G06F 3/0488* (2013.01); *G06K 9/3233* (2013.01)

(58) Field of Classification Search
CPC .. G06K 9/2081; G06K 9/3233; G06K 9/6202; G06F 16/435; G06F 3/0488; G06Q 50/01; G06Q 30/02; G06Q 10/101
See application file for complete search history.

(56) References Cited

U.S. PATENT DOCUMENTS 7,778,487 B2  8/2010  Cohen et al.
7,945,653 B2  5/2011  Zuckerberg et al.
(Continued)

FOREIGN PATENT DOCUMENTS

WO   WO 2013/123098 A1   8/2013
WO   WO 2015/047975 A1   4/2015

*Primary Examiner* — Roland J Casillas
(74) *Attorney, Agent, or Firm* — Rothwell, Figg, Ernst & Manbeck, P.C.

(57) ABSTRACT

The present invention includes systems, methods, and devices for interactive media sharing including a non-transient computer readable storage medium storing a set of instructions for accessing a media item from a first computing device, identifying a first position-of-interest on the media item from a memory component of the first computing device, displaying the media item on a second computing device, identifying a second position-of-interest on the media item from a memory component of the second computing device; generating an area-of-interest surrounding the first position-of-interest; comparing the second position-of-interest with the area-of-interest to determine whether the second position-of-interest intersects with the area-of-interest.

27 Claims, 14 Drawing Sheets

(56) References Cited

U.S. PATENT DOCUMENTS

| | | | |
|---|---|---|---|
| 8,213,916 B1 * | 7/2012 | Yankovich | H04L 65/602 |
| | | | 455/414.3 |
| 8,428,453 B1 | 4/2013 | Spiegel et al. | |
| 9,165,320 B1 | 10/2015 | Belvin | |
| 2008/0091723 A1 * | 4/2008 | Zuckerberg | G06F 16/58 |
| 2008/0120560 A1 * | 5/2008 | Cohen | G06T 11/60 |
| | | | 715/764 |
| 2010/0054600 A1 * | 3/2010 | Anbalagan | G06Q 10/10 |
| | | | 382/180 |
| 2010/0260421 A1 * | 10/2010 | Park | G06F 16/58 |
| | | | 382/180 |
| 2011/0016150 A1 * | 1/2011 | Engstrom | G06F 16/58 |
| | | | 707/778 |
| 2013/0226711 A1 | 8/2013 | Wu et al. | |
| 2014/0087797 A1 * | 3/2014 | Siddharth | A63F 13/005 |
| | | | 463/9 |
| 2014/0109963 A1 | 4/2014 | Chung et al. | |

* cited by examiner

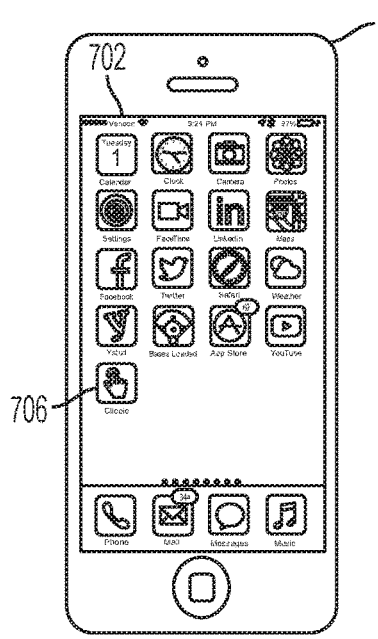
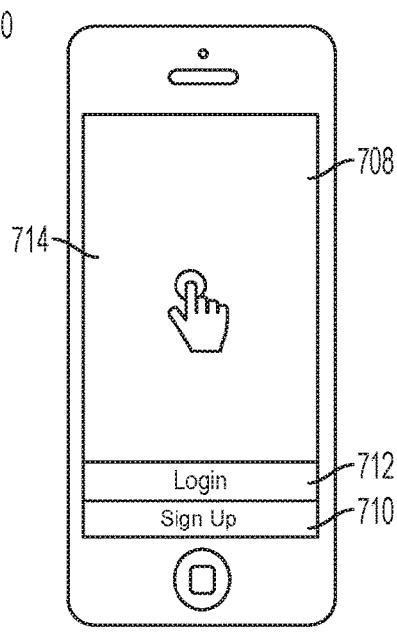
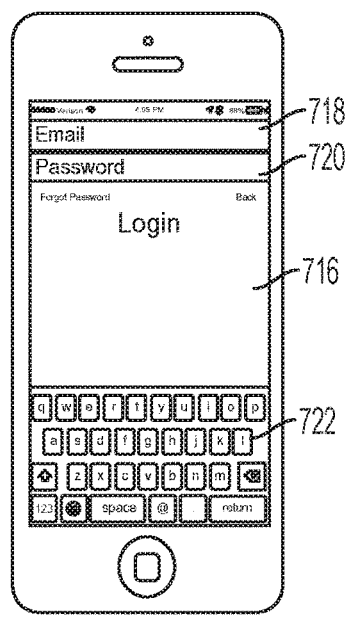
FIG. 7A      FIG. 7B      FIG. 7C
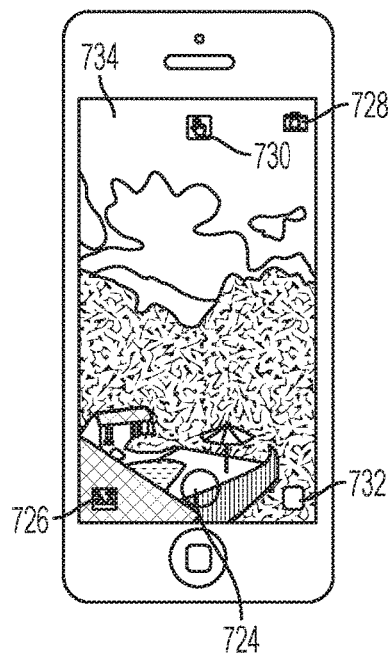
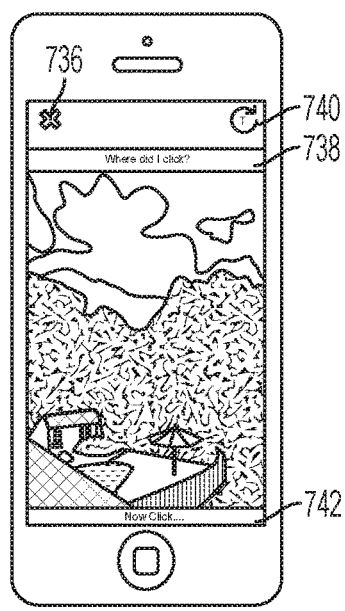
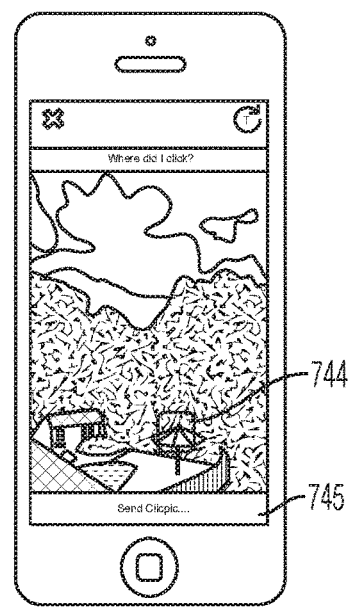
FIG. 7D      FIG. 7E      FIG. 7F

ELECTRONIC SYSTEM FOR COMPARING POSITIONS OF INTEREST ON MEDIA ITEMS

PRIORITY CLAIM TO PROVISIONAL APPLICATION

This non-provisional application claims the benefit of and priority to U.S. Provisional Application No. 62/419,787, filed Nov. 9, 2016, which is incorporated by reference herein in its entirety for all purposes under the law.

FIELD OF THE INVENTION

The subject matter disclosed herein generally relates to an electronic platform that compares user interests on media items between multiple users of computing devices. Specifically, the disclosure addresses systems, devices and methods that allow multiple users of different computing devices to interactively share each others' positions of interest located on a given media item and allow for the comparison of the collective interests of all users on that media item.

BACKGROUND OF THE INVENTION

The popularity of electronic platforms for socialization continues to skyrocket as people share information and engage each other in a multitude of ways through the use of such platforms executing on an array of computing devices.

For example, numerous social media platforms such as Facebook®, Twitter®, Instagram®, Snapchat® and other commercially recognizable platforms connect people in distinctive ways. These platforms serve a continually growing market, evidenced at a minimum by the continued and growing widespread use of such platforms and the economic activity surrounding them.

Such platforms involve complex system arrangements of hardware and software components to produce the desired service and experience for users. However, these platforms are limited in their ability to allow the interaction as described herein involving enhanced comparison of user interests on media items such as digital photographs and videos.

What is described herein is a unique platform in which users can select positions of interest on a media item, share that media item and accompanying interest information with members of a network, and compare the collective interests of the users with respect to that media item within that network. This allows for enhanced interaction and engagement between users, and is accomplished through a unique assortment of hardware and software components, causing an improvement in computer technology that now performs the beneficial functions described herein which were not previously performed by such technology.

SUMMARY OF THE INVENTION

In accordance with one embodiment of the invention, the invention is a non-transient computer readable storage medium storing a set of instructions for accessing a media item from a first memory component of a first computing device, identifying a first position-of-interest on the media item from a memory component of the first computing device, displaying the media item on a second computing device, identifying a second position-of-interest on the media item from a memory component of the second computing device, generating an area-of-interest surrounding the first position-of-interest, and comparing the second position-of-interest with the area-of-interest to determine whether the second position-of-interest intersects with the area-of-interest.

In another exemplary embodiment, the invention is an interactive method of comparing positions-of-interest on media comprising accessing a media item from a first memory component of a first computing device, identifying a first position-of-interest on the media item from a memory component of the first computing device, displaying the media item on a second computing device, identifying a second position-of-interest on the media item from a memory component of the second computing device, generating an area-of-interest surrounding the first position-of-interest, and comparing the second position-of-interest with the area-of-interest to determine whether the second position-of-interest intersects with the area-of-interest.

In another exemplary embodiment, the invention is a mobile device comprising a processor, a display, a media capture controller, a media library storage component, an image capturing sensor to capture a media item, a touch sensor to receive haptic input from a user, an interest-comparing application executing on the device allowing the user to: access a media item from the media library storage component, display the media item on the first computing device, provide a position-of-interest of the user on the media item, identify an area-of-interest of a second user on the media item, and compare the position-of-interest with the area-of-interest to determine whether the position-of-interest intersects with the area-of-interest.

The above and other various aspects and embodiments are described below with reference to the accompanying drawings.

BRIEF DESCRIPTION OF THE DRAWINGS

The accompanying drawings, which are incorporated herein and form part of the disclosure, help illustrate various embodiments of the present invention and, together with the description, further serve to describe the invention to enable a person skilled in the pertinent art to make and use the embodiments disclosed herein.

In the drawings, like reference numbers indicate identical or functionally similar elements.

FIG. 7A illustrates one aspect of a user interface utilized by the users of the system and viewed by each user through each user's device, as shown and described herein.

FIG. 7B illustrates another aspect of a user interface utilized by the users of the system and viewed by each user through each user's device, as shown and described herein.

FIG. 7C illustrates another aspect of a user interface utilized by the users of the system and viewed by each user through each user's device, as shown and described herein.

FIG. 7D illustrates another aspect of a user interface utilized by the users of the system and viewed by each user through each user's device, as shown and described herein.

FIG. 7E illustrates another aspect of a user interface utilized by the users of the system and viewed by each user through each user's device, as shown and described herein.

FIG. 7F illustrates another aspect of a user interface utilized by the users of the system and viewed by each user through each user's device, as shown and described herein.

DETAILED DESCRIPTION OF THE INVENTION

Figure 1:
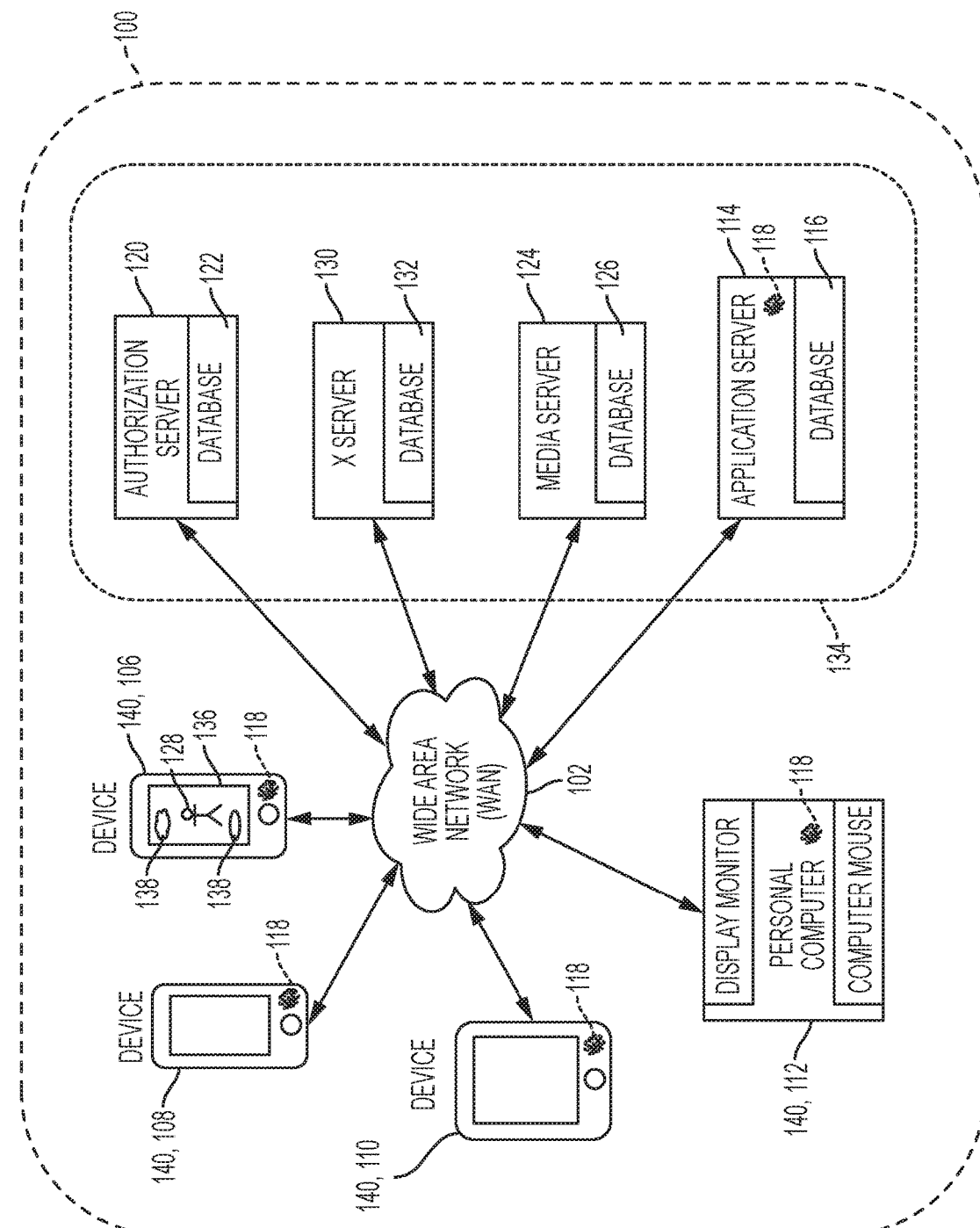
FIG. 1 illustrates a system for comparing user positions-of-interest on media items, as shown and described herein.

Referring now to FIG. 1, an embodiment of a system 100 for the interactive comparing of user interests on media items is shown.

The system 100 includes hardware components configured to communicate across a wide area network 102 or other functional network to allow users to interactively compare their interests relating to media items as described herein.

The system 100 includes one or more user computing devices 140. In this embodiment, as shown in FIG. 1, the user computing devices 140 include a first mobile device 106, a second mobile device 108, a tablet 110, and a personal computer 112. It will be understood that the user computing devices 140 could include these devices, and other computing devices 140 capable of interacting with, and properly functioning within, the system 100. By way of example and without limitation, such other devices could include laptop computers, televisions, mobile devices, digital still photo cameras, digital video cameras, digital audio recording devices, or any other computing devices 140 operating in any environment (e.g., as computing systems operating on automobiles, airplanes, trains, boats and other transportation vehicles). It will be further understood that there is no limit to the number of users who can access the system 100 through use of any number of such user computing devices 140.

The system 100 also includes an application server 114. The application server 114 is a cloud-based or other server configured to communicate with components of the system 100 including the various user computing devices 140 and with other servers in the system 100 over a wide area network 102. The application server 114 also contains one or more memory storage components 116 that are configured to store one or more copies of a system application program 118 configured to operate on multiple components of the system 100, including user computing devices 140. The application server 114 is configured to allow each user to access and download a copy of the system application program 118 onto each user's computing device 140. In this embodiment, each user's computing device 140 contains a copy of the system application program 118.

Referring to FIG. 1, system 100 may include a first smartphone 106 storing and operating a first copy of the system application program 118, a second smartphone 108 storing and operating a second copy of the system application program 118, a tablet 110 storing and operating a third copy of the system application program 118, and a personal computer 112 storing and operating a fourth copy of the system application program 118.

The system application program 118 includes an executable program file containing instructions to, when operating on each user computing device 140, cause each user computing device 140 to provide a user interface 136 to each user. As further described herein, the user interface 136 includes any number of user interface modules 138 allowing the user to interact with, operate within, or otherwise take advantage of and use the system 100.

The system application program 118 executable program file also contains instructions to, when operating on each user computing device 140, cause each user computing device 140 to allow each user to access media items 128; to allow each user to select user positions-of-interest 316 (further described herein in reference to FIG. 3 and elsewhere) for given media items 128; to allow each user to send and receive media items 128 and composite media items 332 (further described herein in reference to FIG. 3 and elsewhere); to communicate with each server (e.g., servers identified herein with element numbers 114, 120, 124, 130) and server network 134 in the system 100; to receive alerts; and otherwise allow each user to properly access and utilize the system, devices, and methods as described herein.

The above examples in no way limit the operational functionality of the system application program 118, and it will be understood that the system application program 118 is configured to perform a number of other operations including the various operations as further described herein.

The application server 114 is also configured to provide program updates to each copy of the system application program 118 operating on each user's computing device, as well as provide other information to users in order to ensure proper operation of the systems, devices and methods as described herein.

The system 100 also includes an authorization server 120. The authorization server 120 is a cloud-based or other server configured to communicate with components of the system 100 including the various user computing devices 140 and with other servers in the system 100 over a wide area network 102.

The authorization server 120 contains one or more memory storage components 122 configured to store information including, but not limited to, information associated with user accounts, user email addresses, user passwords, user password recovery information, usernames, user cell phone numbers, subscription data and other user-related information such as user age, home address and all other user-related information. The authorization server 120 is also configured to assist in the identification, authorization, and verification of users of the system 100 allowing each such approved user to utilize the systems, devices and methods as described herein.

The system 100 also includes a media server 124. The media server 124 is a cloud-based or other server configured to communicate with components of the system 100 including with the various user computing devices 140 and with other servers in the system 100 over a wide area network 102.

The media server 124 contains one or more memory storage components 126 configured to store information including, but not limited to, media items 128 and as described in more detail below composite media items 332. Media items 128 can include, but are not limited to, photographs, videos, graphics, scanned images, animations, and all other digital media in the array of digital file formats. The media server 124 is also configured to store analytics and statistics of the system application program 118 operating on each device, push notification meta-information, and other information capable of being stored on the media server 124 and utilized by the system 100 as described herein.

It will be understood that each of the system 100 components contains non-transient computer readable storage mediums, or other storage mediums, on which such components are capable of storing information including executable and non-executable computer code, related source code, course code, binary files, application program interfaces (APIs), and/or other executable code or instructions.

It will be further understood that communication between any or all of the system 100 components can be performed through operation of one or more application program interfaces (APIs) contained within the system application program 118 or elsewhere within the system 100 allowing communication between system 100 components over a wide area network 102 or other network.

It will be further understood that the server arrangements described herein are provided as examples, but the arrangement of servers could be made in a multitude of other ways, including through one or more additional servers 130 with memory storage components 132 operating within a cloud-based server network 134, and/or other server arrangements that would allow the system, devices, and methods to operate in the manners as described herein. It will be further understood that such additional servers could include third party servers operated by other services and networks including other social media platforms. It will be further understood that physical servers could be replaced by virtual machine server or other alternative servers and server systems that perform the same function that physical servers perform in accordance with the operation of operation of the systems, devices, and methods as described herein.

Figure 2:
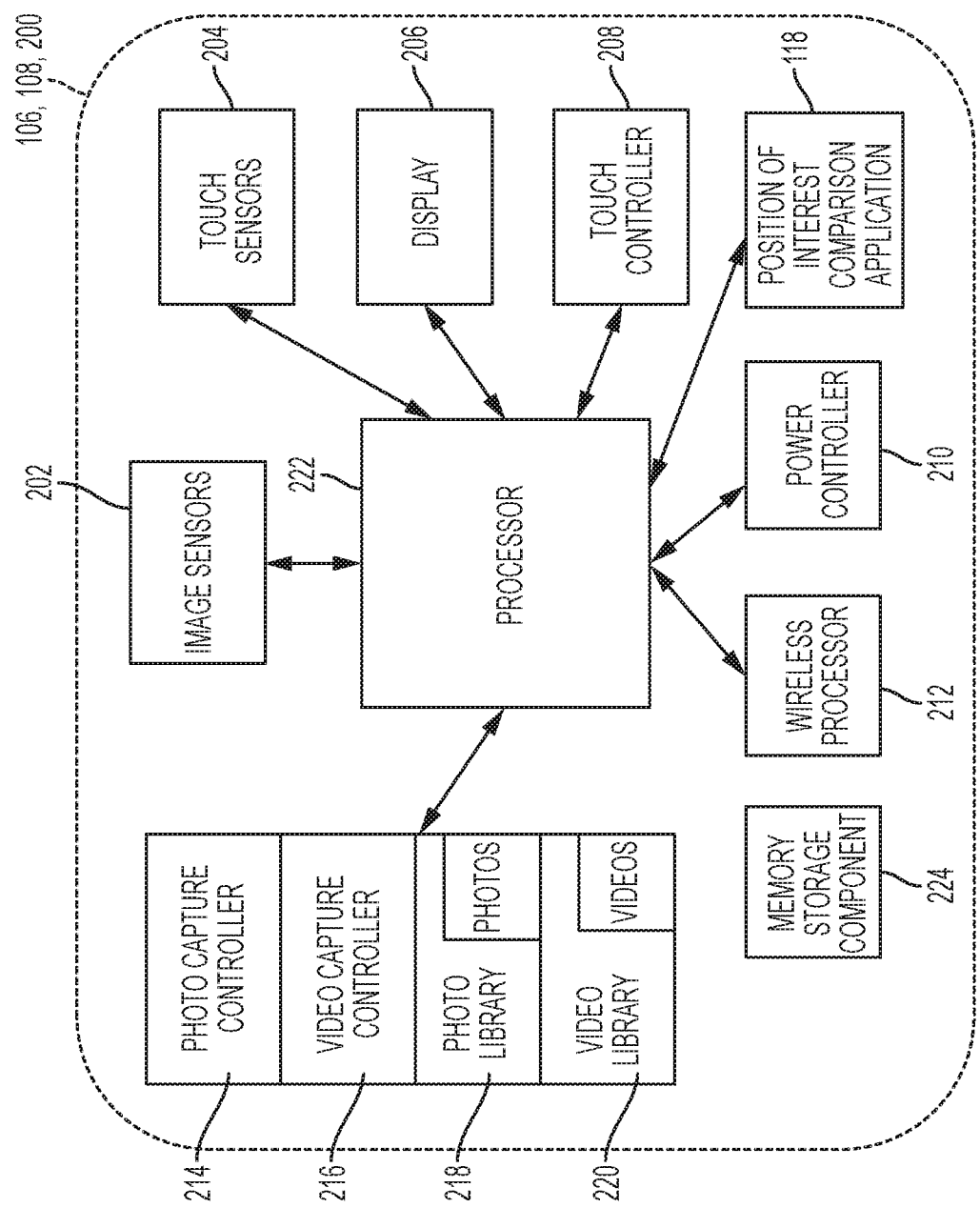
FIG. 2 illustrates components and aspects of a device configured to allow users to compare their respective positions-of-interest on media items with those of other users, as shown and described herein.

Referring now to FIG. 2, further description of components contained in user computing devices 140 is shown. In this embodiment, the components illustrated represent certain components contained in haptic (touch) control mobile devices 106, 108, tablets 110, and other haptically-controlled devices.

In this embodiment, the devices have at least one image sensor 202, touch sensor 204, display 206, touch controller 208, power controller 210, wireless processor 212, digital image capture controller 214, video capture controller 216, digital image library 218, video library 220, device processor 222, and one or more memory storage components 224. It will be understood that other components of such devices can also be utilized to operate such devices in conjunction with the systems, devices, and methods as described herein. The devices are configured to store and execute copies of the system application program 118 that operate on each device and communicate with the system 100 servers and other system 100 components over the wide area network 116 as described herein.

It will be understood the same or similar components described and shown in FIG. 2 could be contained in other user computing devices 140, including other components used in other haptically-controlled as well as non-haptically-controlled computing devices 140. For example, a desktop computer, laptop computer or smart television would have many of the same or similar components as described herein, but with some potentially different components (e.g., non-haptic, point-and-click and/or remote control systems). Nonetheless, it will be understood that such computing devices are able to properly and fully operate within the system, through utilization of such different components to accomplish the same functions (for example, utilizing point-and-click technology, instead of haptic contact, to select positions-of-interest 316).

Figure 3:
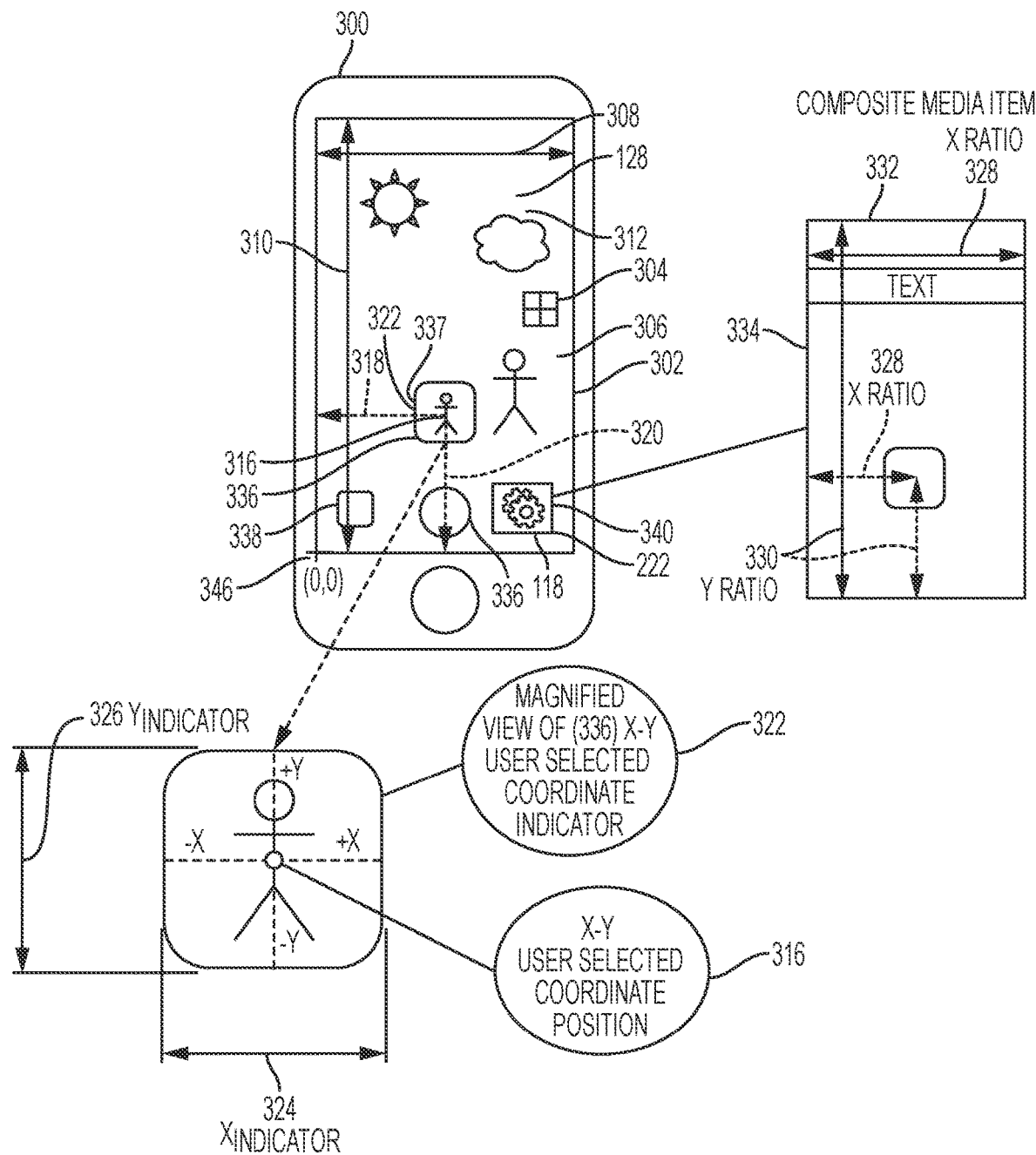
FIG. 3 illustrates additional components and aspects of a device configured to allow users to compare positions-of-interest on media items with other users, as shown and described herein.

Referring now to FIG. 3, further description of the user computing devices 140 is provided, here as a haptically-controlled device 300 operating the system application program 118. It will be understood that the device 300 has the same core features and characteristics as the other haptically-controlled devices described and shown herein (e.g., devices 106, 108, 110 and as shown and described in FIG. 2) and is representative of the same or similar devices utilized by multiple users.

In this embodiment, the device 300 has a display 302. The display 302 includes numerous pixels 304 arranged to provide a viewable and interactive user interface 306 to a user. Further description of embodiments and examples of user interfaces 306 are set forth below in reference to FIG. 7. It will be understood that the user interfaces of the present invention can include various modules (described in more detail in reference to FIG. 7) allowing the user to interact with the system 100, including with other users, and that the modules for the user interfaces described herein are provided as certain examples and in no way limit the number or types of modules, or arrangements of such modules, that can be provided on user interfaces for the present invention.

Referring back to FIG. 3, in this embodiment, the display 302 has a width of seven hundred and fifty (750) total pixels 304 in the lateral X direction 308, and a height of one thousand three hundred and thirty four (1,334) total pixels in the vertical Y direction 310. It will be understood that the total number of pixels in the X direction, Y direction, and otherwise, can vary, depending on the device display 302 dimensions and density of pixels 304 provided in the display 302 of any given computing device 140, and the density of pixels described herein is no way meant to limit total pixel density. The system application program 118 operating on the device 300 is configured to identify the dimensions of the device display stored in the memory of the device 300, including the total pixel height 310 and pixel width 308 of the device 300.

The system application program 118 operating on the device 300 is configured to allow a user to access a media item 128 already stored on the device 300, in this embodiment a digital image 312, and interact with that image 312 in accordance with operation of the systems, devices and methods as described herein. In this embodiment, the user obtains such access by haptically contacting the media item access module 338 (see also FIG. 7D at 726) located on the user interface 306 shown on the display 302.

Here, once the media item access module 338 is haptically contacted, the system application program 118 operating on device 300 is configured to access the digital image library 218 of the device 300 and allow the user to select a desired digital image 312 in the library 218. Once the user selects the desired image 312, the system application program 118 operating on device 300 is configured to cause that selected digital image 312 to be shown on the display 302 within the user interface 306, and allow the user to interact with that image 312 in accordance with the operation of systems, devices and methods as described herein.

Similarly, the system application program 118 operating on the device 300 is also configured to allow a user to capture a new media item 128 (here a digital image 312), and interact with that image 312 in accordance with the operation of systems, devices and methods as described herein. In this embodiment, the user captures such an image 312 by haptically contacting the media item capture module 336 (see also FIG. 7D at 724) located on the user interface 306 shown on the display 302.

Here, once the media item capture module 336 is haptically contacted, the system application program 118 operating on device 300 is configured to cause the device 300 photo capture controller 214 to capture and display that image 312 on the display 302 and within the user interface 306 of the device 300, and allow the user to interact with that image 312 in accordance with the operation of systems, devices and methods as described herein.

The system application program 118 operating on the device 300 is also configured to identify and store user-created positions-of-interest 316 on a given media item 128 generated through each user's haptic contact engagement with the display 302 of the device 300, whereas each user-generated position-of-interest 316 correlates to the location on the display 302 and media item 128 where each user contacted the display to provide his or her position-of-interest 316 for each respective media item 128.

In this embodiment, the system application program 118 operating on the device 300 is configured to identify and store each such position-of-interest 316 as a single pixel located at a single X, Y coordinate on each user device 300. It will be understood in this embodiment that the X and Y coordinates are to be measured from the 0 (X), 0 (Y) origin position 346 located at the bottom left-hand corner of the display 302. It will be further understood that the origin location position 346 can also be placed at other locations on the device display 302.

In the embodiment shown in FIG. 3, the position-of-interest 316 is three hundred seventy five (375) pixels in the X direction 318, and four hundred twenty five (425) pixels in the Y direction 320, representing a single point within the area in which the user touches the display 302 as determined by the device 300. That is, it will be understood that the physical touch of a finger on a display represents physical contact with multiple pixels on the display 302 representing an area of contacted pixels on the display 302, and that the position-of-interest 316 is initially determined by the appropriate device 300 sensors (e.g., touch sensors 204 and controllers 208) as a single pixel location on the display 302 and/or image 312. It will be further understood that the system application program 118 operating on the device 300 is configured to call and access each such position-of-interest 316 from the memory of the device 300 in accordance with the operation of operation of the system 100 as described herein.

The system application program 118 operating on the device 300 is also configured to normalize the position-of-interest 316 information for each media item 128 in relation to the display 302 size of each device. It will be understood that the normalized coordinate information allows the system application program 118 to accommodate for the different shapes and sizes of the displays and images of the different user devices to be utilized within the system 100. The normalization operation ensures that the position-of-interest 316 information for each user correctly correlates to the selected positions-of-interest 316 on each media item 128 in which each user is interested, regardless of which device each such image and corresponding positions-of-interest are viewed on (for example, a first user's position-of-interest 316 provided on a media item 128 shown on a mobile device 106, will appear on the same relative location on that media item 128 when that media item 128 is displayed on a second user's tablet 110 device which has a much larger screen size).

As described and shown in more detail in reference to FIGS. 8 and B and the steps provided therein, the system application program 118 normalization operation includes dividing the total number of pixels 304 in the X coordinate of the position-of-interest 318 by the total number of pixels 304 in the total lateral length 308 of the display 302, creating an $X_{ratio}$ 328 for that particular position-of-interest 316. Similarly, the system application program 118 also divides the total number of pixels 304 in the Y coordinate 320 of the position-of-interest 316 by the total number of pixels 304 in the total vertical height 310 of the display 302, creating a $Y_{ratio}$ 330 for that particular position-of-interest 316.

The system application program 118 operating on the device 300 is also configured to cause the device 300 to store, in its device memory storage component 224 or elsewhere each $X_{ratio}$ 328 and $Y_{ratio}$ 330 position-of-interest coordinates in association with each media item 128, in this embodiment each digital image 312 utilized by the system 100.

The system application program 118 operating on device 300 is also configured to store a composite media item 332 on the memory storage component of the device 300, send the composite media item 332 to the media server 124, and access one or more components of the composite media item 332 from the media server 124. The composite media item 332 includes the media item 312 and normalized $X_{ratio}$ 328 and $Y_{ratio}$ 330 data associated with a unique device identifier 340 identifying each device as belonging to each user of the system 100. Other information, such as text provided in a text input module 334, tagging, and other information to appear on a user interface 306 in association with the media item 128, can also be combined with or otherwise attached to the digital image 312 to provide additional aspects of the composite media item 332.

It will be further understood that the normalization operations described herein do not need to be dependent on display 302 parameters. That is, the normalization operations can be based upon the dimensions of the given media item 128 itself, rather than in relation to the dimensions of each display 302. The position-of-interest 316 for each user could also be retained in memory in a number of different ways including (1) at a location on a sub-display (such as a smaller display contained within a larger display 302, similar to a picture-in-picture viewing format), or (2) at a location on an image in which the position-of interest is identified and viewable on and retained within the image file itself (e.g., where a viewable digital mark is placed on the image itself and the modified image is stored as a PNG, JPEG file).

The system application program 118 operating on device 300 is also configured to identify an area-of-interest 322 surrounding a position-of-interest 316 on a given media item 128. The system application program 118 generates the area-of-interest 322 by calculating out a predetermined pixel distance from the position-of-interest 316 in each direction in a concentric fashion. In this embodiment, the system application program 118 sets the position-of-interest 316 as the 0(X), 0(Y) origin (as opposed to the lower left corner of the display 346). The system application program 118 operating on device 300 is configured to calculate out twenty-five (25) pixels 304 in the positive X direction, twenty-five (25) pixels 304 in the positive Y direction, twenty-five (25) pixels 304 in the negative X direction, and twenty-five (25) pixels 304 in the negative Y direction from the position-of-interest origin 316.

In this embodiment, following those calculations, the system application program 118 operating on device 300 generates an overlay $X_{indicator}$ 324 and overlay $Y_{indicator}$ 326, representing the dimensions of the area-of-interest 322 concentrically surrounding position-of-interest 316 measured in pixels 304. In this embodiment, the area-of-interest $X_{indicator}$ 324 is fifty (50) total pixels wide and $Y_{indicator}$ 326 is fifty (50) total pixels tall, representing two-thousand five hundred (2,500) square pixels concentrically surrounding the user's position-of-interest 316.

The system application program 118 operating on device 300 is configured to display the area-of-interest through the user interface 306 as a rounded square 337. It will be understood that the area-of-interest 322 is also normalized such that it appears in the same position (concentrically surrounding the position-of-interest 316) on each user's device regardless of the display size of each user's device 300.

Figure 4:
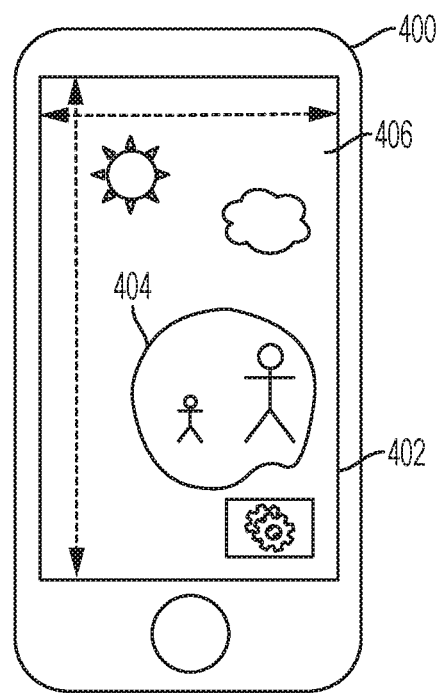
FIG. 4 illustrates an embodiment of a user-generated position-of-interest on a device configured to allow users to compare positions-of-interest on media items with those of other users, as shown and described herein.

It will be further understood that the area-of-interest 322 can be of any size and shape as determined in accordance with the operation of calculations set forth and executed by the system application program 118. It will be further understood that the area-of-interest 322 can also be determined in accordance with the operation of user's direct selection of the area-of-interest 322. Accordingly, referring now to FIG. 4, another embodiment of a user-selected area-of-interest 404 is shown. In this embodiment, by operation of the system application program 118, the user can select through haptic contact engagement with the display 402 of the device 400 an area-of-interest of interest 404 on the media item 406 in the size and shape the user prefers.

Referring back to FIG. 3, the system application program 118 operating on device 300 is also configured to allow each user to transmit composite media items 332 to the media server 124 and other components of the system 100 over a wide area network 102 to allow the system application program 118 operating on each device to perform operations to display certain aspects of the composite media items 332 to users.

That is, as further described herein, the system application program 118 operating on device 300 is configured to allow users, who receive access to a composite media item 332 from a sending user, to view certain components of each composite media item 332, as determined by the system application program 118 operating on each device 300.

For example, in one embodiment, a first sending user views a captured digital image 312 within the user interface 306 of the system application program 118, haptically selects a position-of-interest 316, types "where did I click?" in the text input module 334, and (as described in more detail below) sends the composite media item 332 (containing the image 312, normalized position-of-interest 316, unique device identifier 340, and text information) to a media server 124 such that an authorized first receiving user can gain access to the composite media item 332. In this embodiment, the system application program 118 operating on the first receiving user's device 300 allows the first receiving user access only to the sending user's digital image 312 and text provided in the text input module 334, and displays those items on the first receiving user's display only, but does not at that time allow the sending user's position-of-interest 316 or area-of-interest 322 (normally shown as a rounded square 337) to be shown on the receiving user's display. This is but one example of how the system application program 118 operating on each device 300 can be configured to show, or not show, each component sent and received between users of the system 100. It will be understood that many other information items, and combinations and configurations of information items, can be displayed or not displayed on user devices, depending on the desired parameters of the operation of the system 100 and users utilizing that system 100.

It will be further understood that the parameters of user interaction with media items 128 in the system 100 are variable and controlled by the system application program 118 operating on each device 300. For example, in this embodiment, and as further described and shown in FIGS. 9A and 9B, the system application program 118 operating on device 300 is configured to give receiving users a limited amount of time (e.g., 5 seconds) to provide each of their positions-of-interest in response to the text query "where did I click?" This timing limitation is variable and provides the added effect of encouraging users to quickly provide their position-of-interest 316 in response to the text query or otherwise, or risk being found by the system application program 118 to have failed to respond.

The system application program 118 operating on device 300 is also configured to compare each receiving user's selected position-of-interest 316 with the sending user's area-of-interest 322. Specifically, the system application program 118 operating on device 300 is configured to perform a comparison operation to determine whether a receiving user's position-of-interest 316 is contained within the sending user's area-of-interest 322 (generated as an overlay of the $X_{indicator}$ 323 and $Y_{indicator}$ 326 after the first user's position-of-interest 316 is normalized to the dimensions of the second user's display), and to alert each user regarding the result of that operation on each user's device display 302.

Figure 5:
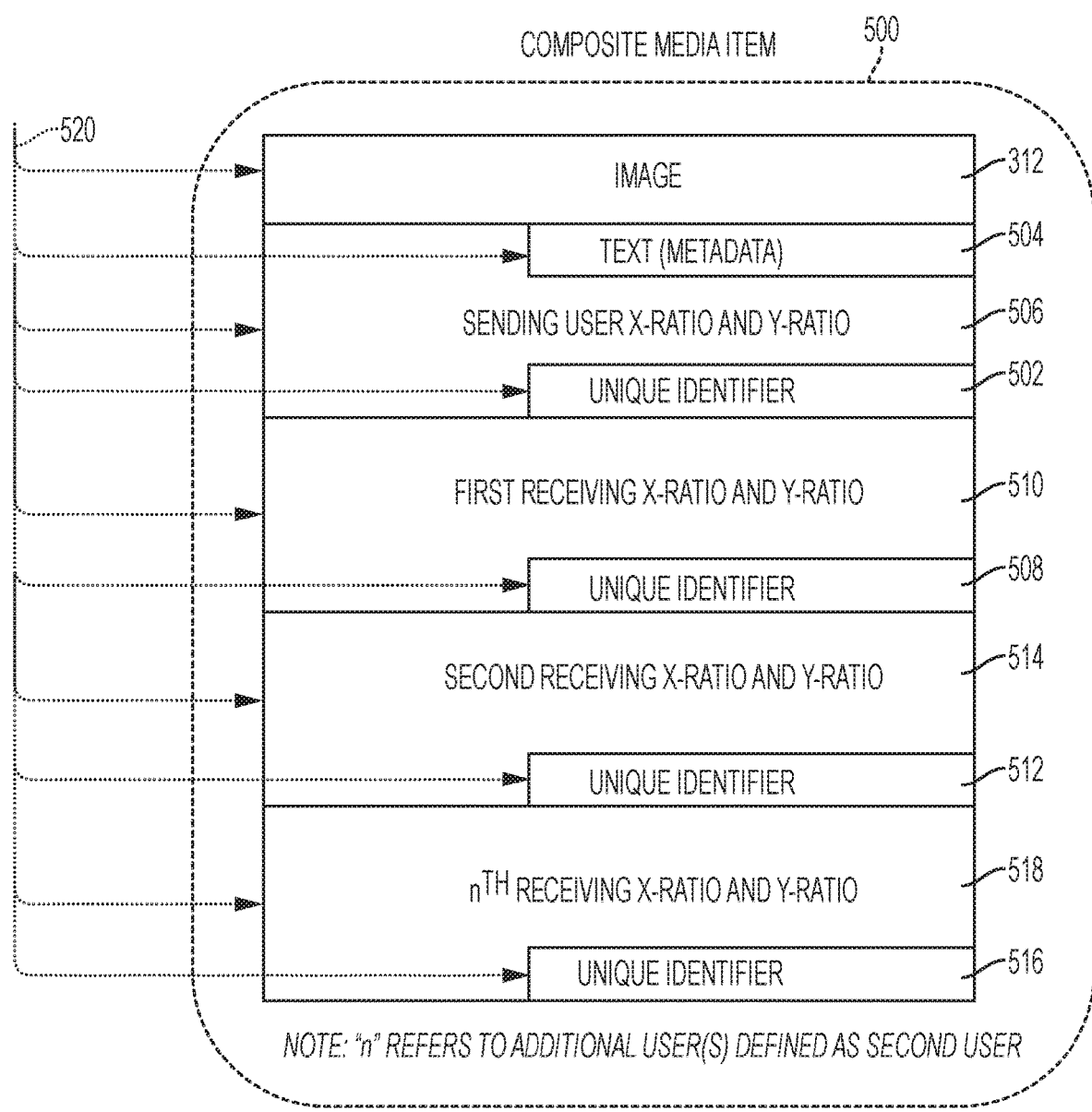
FIG. 5 illustrates a composite media item taking into account the collective positions of interest provided by the users of the system, as shown and described herein.

Referring now to FIG. 5, an embodiment of a composite media item 500 is shown. In this embodiment, the composite media item 500 is comprised of the collection of composite user data 520 that the users each provide in connection with a particular media item 312. As shown, the collection of composite data 520 could include: a sending user's unique device identifier 502, text message component 504, and $X_{ratio}$ 328 and $Y_{ratio}$ 330 position-of-interest information 506 for that image 312; a first receiving user's unique device identifier 508 and $X_{ratio}$ 328 and $Y_{ratio}$ 330 position-of-interest information 510 for that image 312; a second receiving user's unique device identifier 512 and $X_{ratio}$ 328 and $Y_{ratio}$ 330 position-of-interest information 514 for that image 312; and an $n^{th}$ receiving user's unique device identifier 516 and $X_{ratio}$ 328 and $Y_{ratio}$ 330 position-of-interest information 518 for that image 312 (with "n" representing any number of additional users)).

It will be understood that such composite data 520 for each and every user of the system 100 could include additional data items. For example, the receiving users could also add text information to the media items 312 they receive, any user could add haptically inputted notations or drawings, any user could add audio or video information in association with the media items 312 they send or receive, and any user could add (or have added by operation of system application program 118 or otherwise) other metadata to any given media item 312 or composite media item 500 they send or receive.

Based on all user inputs, the system application is configured to display each user's normalized $X_{ratio}$ 328 and $Y_{ratio}$ 330 position-of-interest information (shown here as element numbers 506, 510, 514, and 518) to each user on the display of each user's device. It will be understood that this information can be displayed in any number of ways.

Figure 6A:
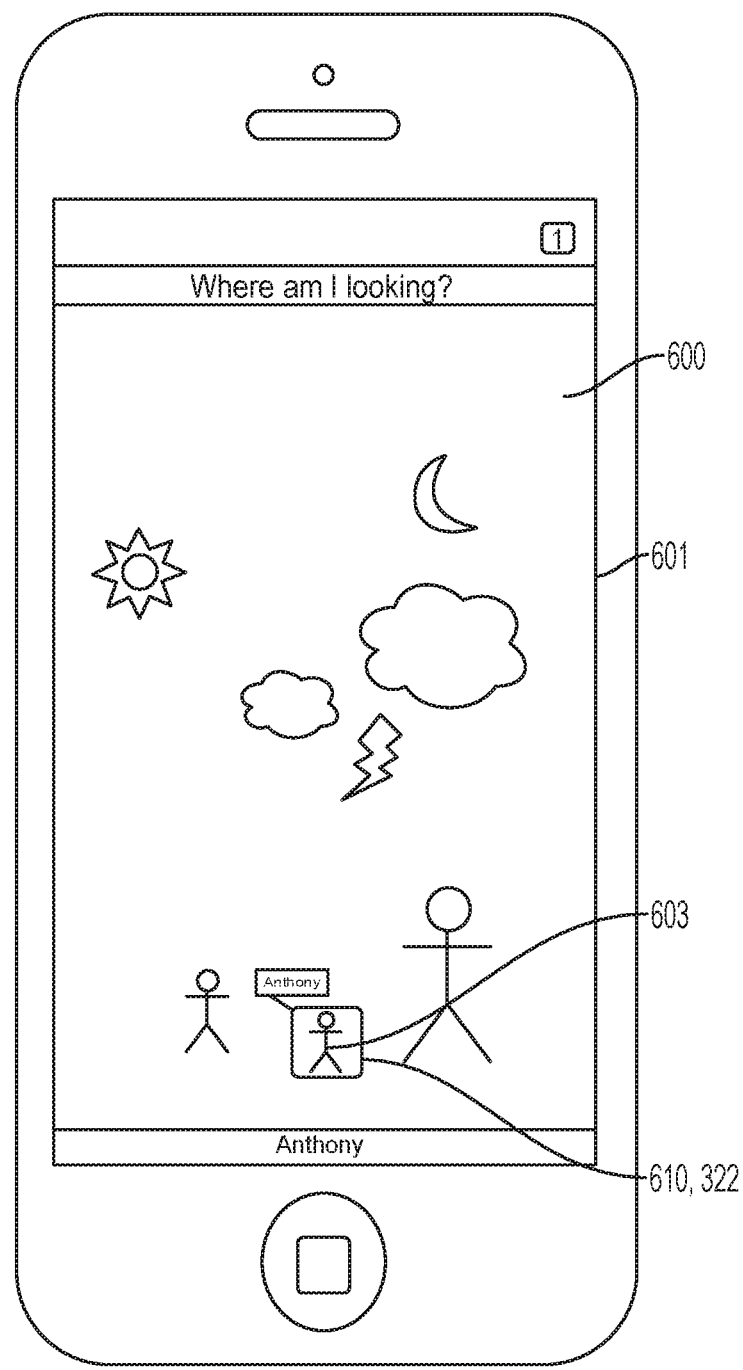
FIG. 6A illustrates one aspect of a user graphical interface displaying the collective positions-of-interest of the users of the system, as shown and described herein.

For example, referring now to FIG. 6A, here a digital image 600 is viewed by the first (sending) user on the display 601 of the first user's device. The first user selects a position-of-interest 603 (for "Anthony"), and the application operating on the first user's devices generates an area-of-interest 610 surrounding the position-of-interest 603 in accordance with the operation of invention as described herein, and he first user types "Where am I looking?" into the text module.

Figure 6B:
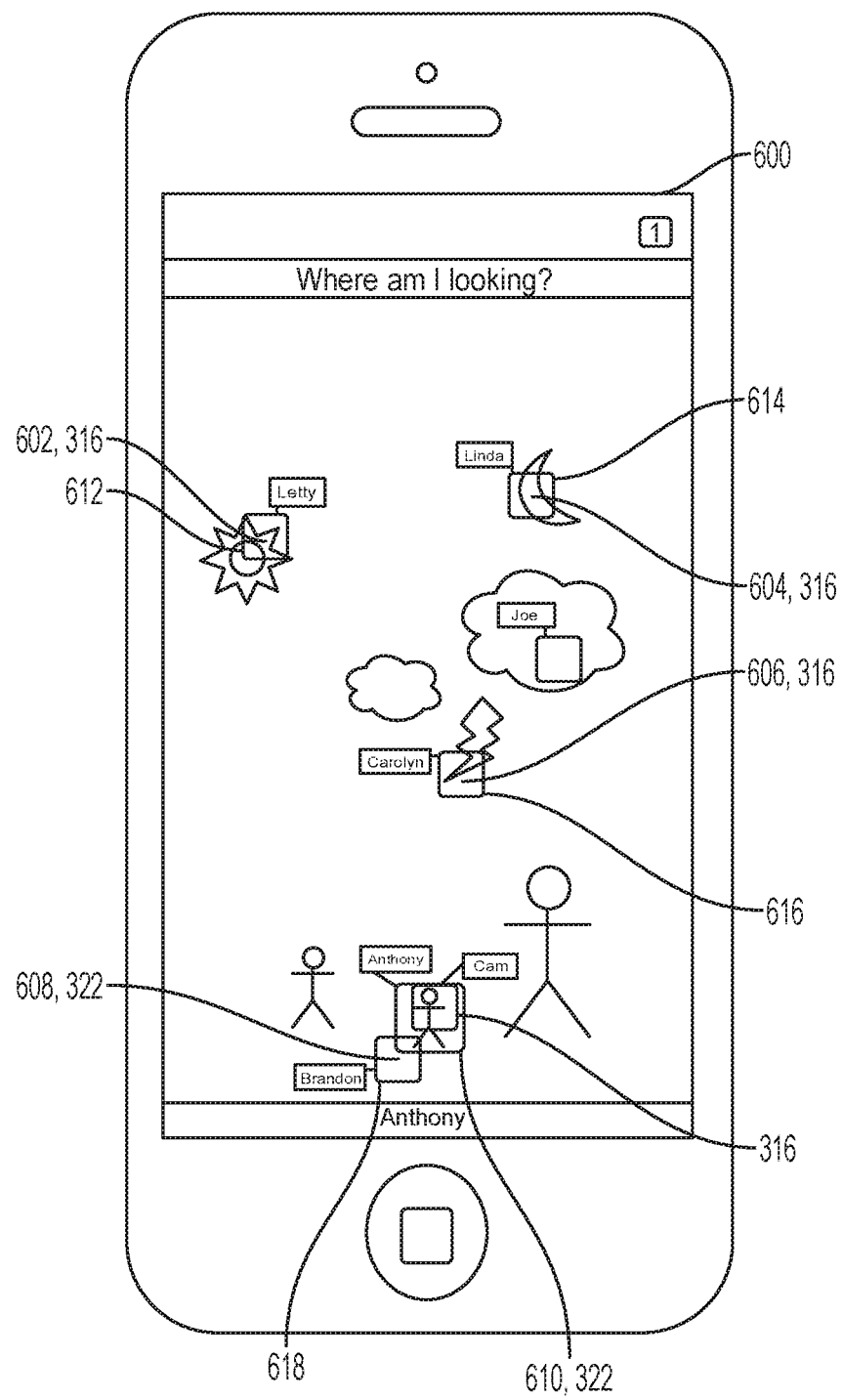
FIG. 6B illustrates another aspect of a user graphical interface displaying the collective positions-of-interest of the users of the system, as shown and described herein.

Referring now to FIG. 6B, each (receiving) user's position-of-interest information 602 (for "Lefty"), 604 (for "Linda"), 606 (for "Carolyn"), and 608 (for "Brandon") (properly normalized for display on each user device) is displayed as rounded squares 612, 614, 616 and 618, with dimensions of twenty (20) pixels wide and twenty (20) pixels tall, concentrically surrounding each user's normalized position-of-interest 602, 604, 606, and 608 and shown on each display in relation to each sending user's area-of-interest 322, 610 (which is a larger rounded square 337 as described herein).

It will be understood that such information can be displayed to each user utilizing various effects. For example, in this embodiment, the comparative position-of-interest information is displayed on each device in a timed manner as follows: the sending user's area-of-interest 610 (for "Anthony") is shown first; one second later the first receiving user's position-of-interest rounded square 612 (for "Lefty") is shown; one second later the second receiving user's position-of-interest rounded square 614 (for "Linda") is shown; one second later the third receiving user's position-of-interest rounded square 616 (for "Carolyn") is shown; one second later the fourth receiving user's position-of-interest rounded square 618 (for "Brandon") is shown, and so forth. It will be understood that, in this embodiment, each of these rounded squares appears serially, and remains on the display to create a "building" effect. The end result is the user interface 306 displaying a building or stacking effect being "played" over a period of several seconds with each user's interest serially viewable as overlays to the digital image 600. It will be understood that, in this embodiment, these effects can be "replayed" by each user, any number of times, through each user's haptic contact engagement with the comparison review modules 760 or other modules shown on each user's display (further described, for example, in relation with FIG. 7J).

Referring now to FIG. 7, several embodiments of a user interface 708 displayed by the system application program 118 is shown. It will be understood that the mobile device 700 shown in FIG. 7 is identical to the other mobile devices described herein, and the details of the user interface 708 described herein can be applied to any of the devices 106, 108, 110, 112 or other devices capable of operating within the system 100 whether haptically-controlled or not haptically-controlled.

Referring now to FIG. 7A, a home screen 702 of a mobile device 700 is shown. Located on the home screen is the application initiation module 706 that a user can haptically contact to initiate execution of the system application program 118 operating on the device 704.

In FIG. 7B, a first aspect of the system application program 118 user interface 708 is shown. In this embodiment, the system application program 118 provides sign-up 710 and login 712 modules for the user to select in order to register and participate in the system 100. In this embodiment, the user selects these options through haptic contact engagement with the display 714.

In FIG. 7C, a user login screen 716 is shown. In this embodiment the system application program 118 directs the user to provide login information including the user's login email address 718 and password 720. In this embodiment, the user provides this information by typing this information on a keypad 722 provided by the system application program 118 on the display 714.

In FIG. 7D, another aspect of a user interface 708 is shown. In this embodiment, the user interface 708 contains a haptically-controlled media item capture module 724 (allowing the user to capture a media item 734), media item access module 726 (allowing the user to access a media item 734 from the device digital image library), reverse media item capture module 728 (allowing the user to capture a media item 734 from a perspective looking out from the display), main menu module 730 (allowing the user to access the system application program 118 main menu), and click status 732 module (allowing the user to view the status and history of the user's prior activity operating within the system).

In FIG. 7E, another aspect of the user interface 708 is shown. In this embodiment, the user interface 708 contains an escape module 736 (allowing the user to cancel out of a particular interface screen), text input module 738 (allowing a user to manually input text to associate with a given media item 714), prepared text input module 740 (allowing the user to select a pre-drafted phrase to input into the text input module 738), and user instruction module 742 (instructing the user as to what to do next—here shown as "now click"). It will be understood that the text input module 738 can include text with varying font styles and sizes or other information including, but not limited to, emoticons, emojis, images, and videos.

In FIG. 7F, another aspect of the user interface 708 is shown. In this embodiment, the user interface 708 contains a rounded square 744 representing the user's area-of-interest 322.

Figure 7G:
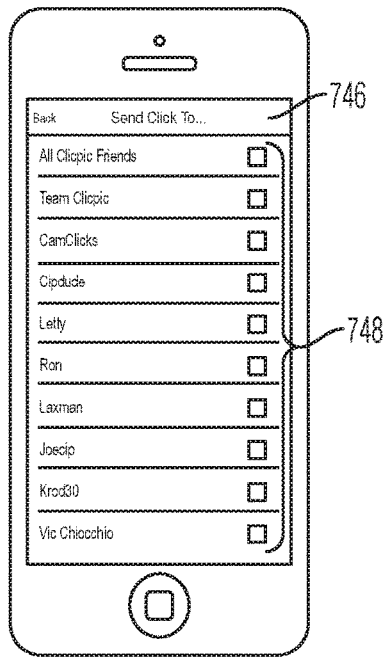
FIG. 7G illustrates another aspect of a user interface utilized by the users of the system and viewed by each user through each user's device, as shown and described herein.
Figure 7H:
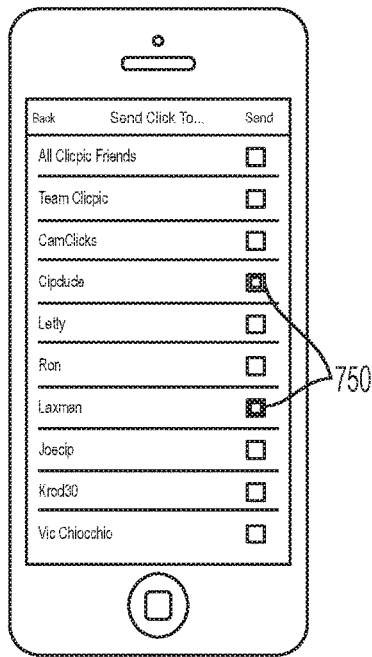
FIG. 7H illustrates another aspect of a user interface utilized by the users of the system and viewed by each user through each user's device, as shown and described herein.

In FIG. 7G, another aspect of the user interface 708 is shown. In this embodiment, the user interface 708 contains a user send module 746 (allowing the user to send or otherwise allow access to a composite media item 332 for certain users) and list of user recipients 748 (representing the list of other users allowed to access composite media items 332 within the system) is shown. As further seen in FIG. 7H, user selection modules 750 (allowing a user to individually select which users are to gain access to the composite media item 332).

Figure 7I:
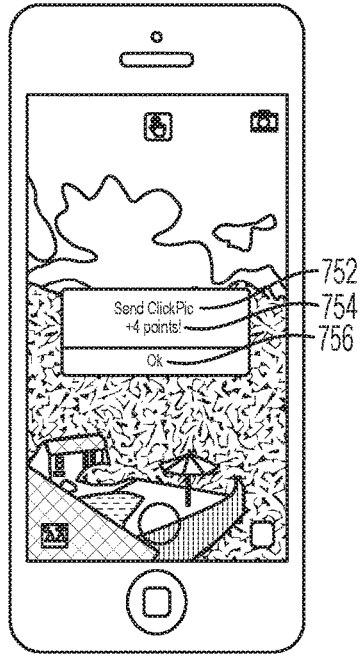
FIG. 7I illustrates another aspect of a user interface utilized by the users of the system and viewed by each user through each user's device, as shown and described herein.

In FIG. 7I, another aspect of the user interface 708 is shown. In this embodiment, the user interface 708 contains an alert window 752 (alerting the sending user that the composite media item 332 has been sent), alert text 754 (providing a message to the user such as shown here "+5 points"), and alert confirmation module 756 (requesting the user to touch "Ok" to confirm the previous operation).

Figure 7J:
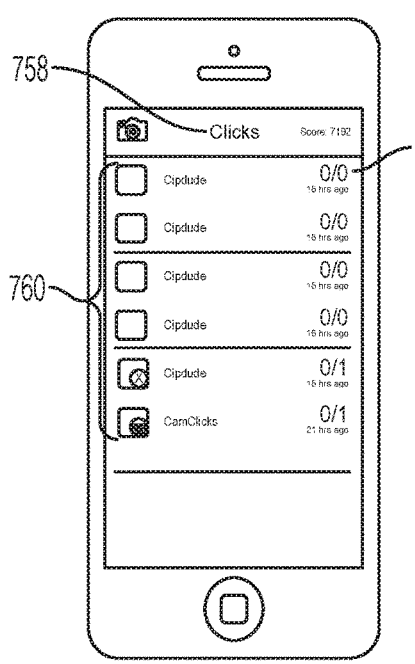
FIG. 7J illustrates another aspect of a user interface utilized by the users of the system and viewed by each user through each user's device, as shown and described herein.

In FIG. 7J, another aspect of the user interface 708 is shown. In this embodiment, the user interface 708 contains a sending user's click status heading 758 and click status listing 759 (showing the status of the user interaction history on the system). Here the user interface includes comparison review modules 760, allowing each user to, among other things, review or replay the comparison of positions-of-interest for each given media item 312.

Figure 7K:
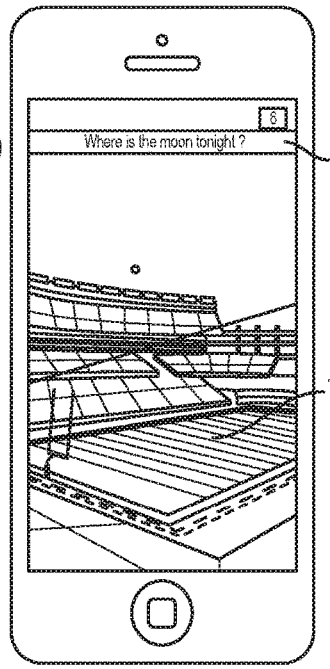
FIG. 7K illustrates another aspect of a user interface utilized by the users of the system and viewed by each user through each user's device, as shown and described herein.

In FIG. 7K, another aspect of the user interface 708 is shown. In this embodiment, a recipient user's user interface 772 is shown. Here, the recipient user can view the text that the sending user provided in the text input window 774 as well as the digital media item 312 (here digital image 762).

Figure 7L:
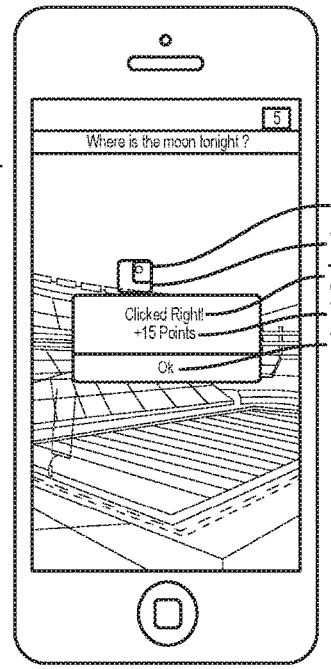
FIG. 7L illustrates another aspect of a user interface utilized by the users of the system and viewed by each user through each user's device, as shown and described herein.

In FIG. 7L, another aspect of the user interface 708 is shown. In this embodiment, the user interface 708 contains the sending user's area-of-interest 767 (surrounding the location of the recipient user's position-of-interest), a receiving user's position-of-interest (showing whether the receiving user's position-of-interest intersected with the sending user's area-of-interest), and an alert window 770 (alerting the user whether the receiving user's position-of-interest matched the sending user's position-of-interest) alert text 772 (providing a message to the user such as shown here "+10 points"), and alert confirmation module 774 (requesting the user to touch "Ok" to confirm the previous operation).

Figure 7M:
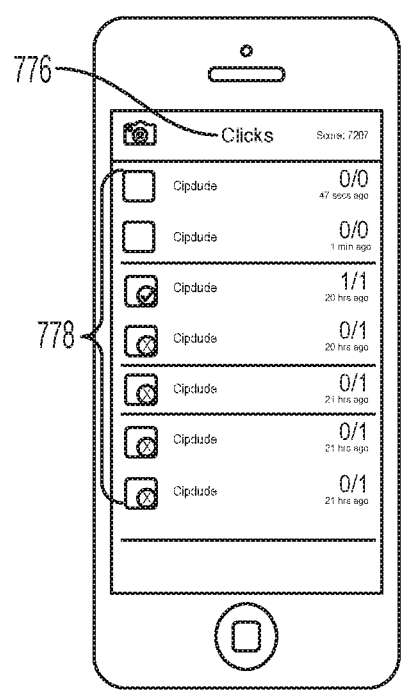
FIG. 7M illustrates another aspect of a user interface utilized by the users of the system and viewed by each user through each user's device, as shown and described herein.

In FIG. 7M, another aspect of the user interface 708 is shown. In this embodiment, the user interface 708 contains a receiving user's click status heading 776 and click status listing 778 (showing the status of user interaction history on the system).

Figure 8A:
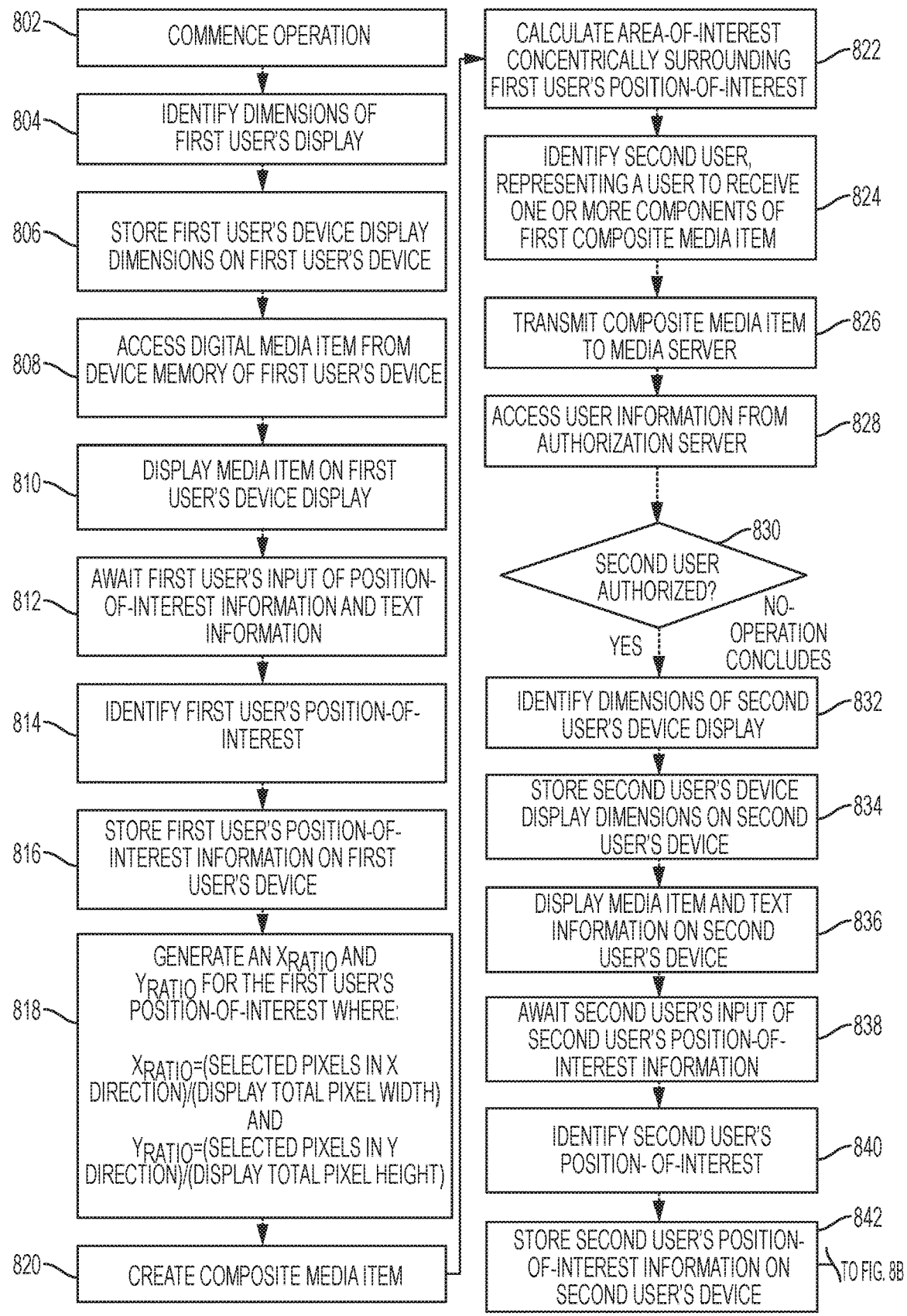
FIG. 8A illustrates, from the perspective of the system, a method of comparing respective positions of interest on media items among users of the system, as shown and described herein.
Figure 8B:
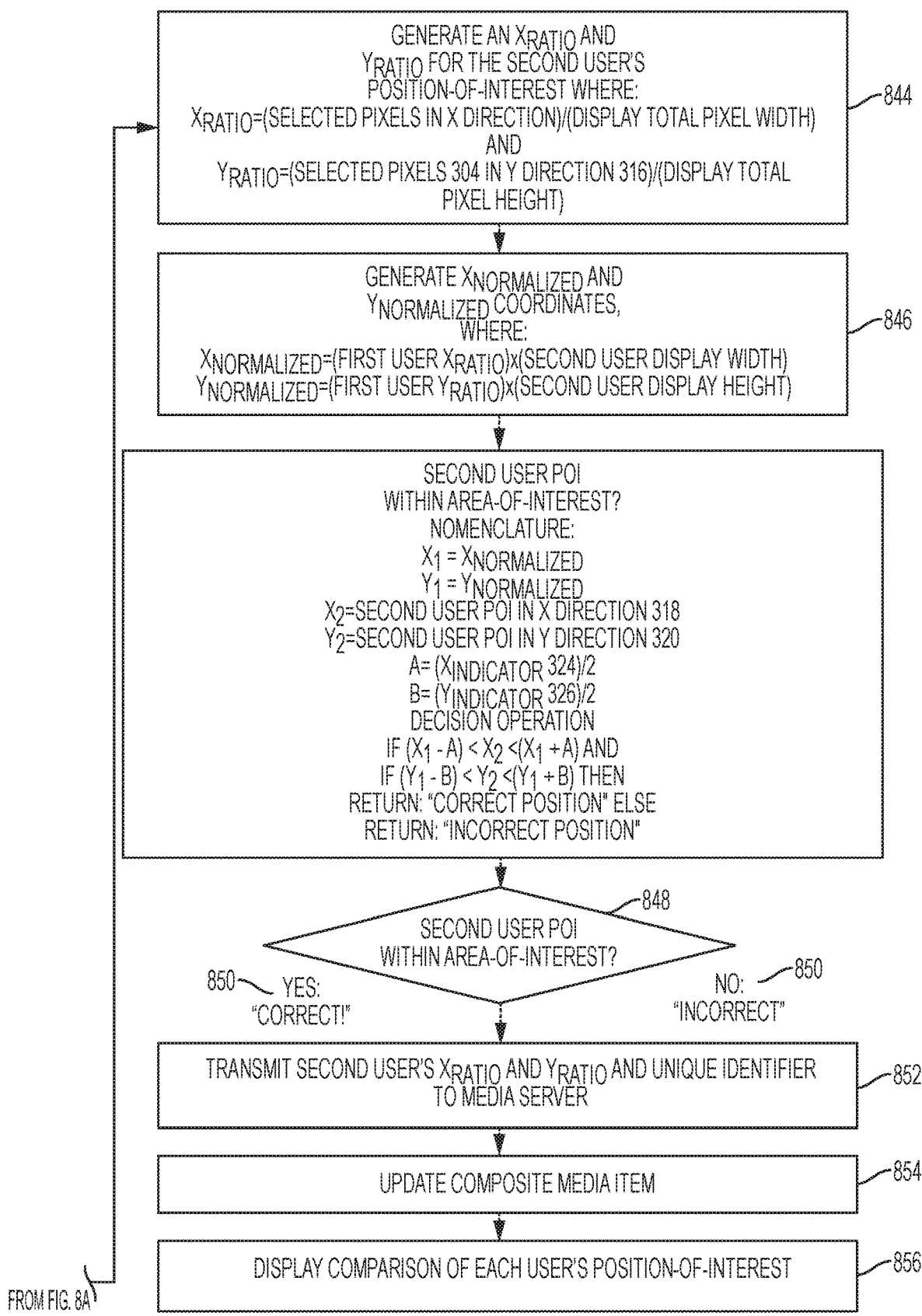
FIG. 8B further illustrates, from the perspective of the system, a method of comparing respective positions of interest on media items among users of the system, as shown and described herein.

Referring now to FIGS. 8A and 8B, an embodiment of a position-of-interest comparison method 800 is shown. In this embodiment, it will be understood that the described method 800 involves a first (sending) user utilizing a mobile device 106 and a second (receiving) user utilizing a tablet device 110, with each device having different display sizes. It will be further understood that the devices referenced in FIG. 8 and later in FIG. 9, include the components and features of the devices as previously shown and described herein, as indicated in FIGS. 8 and 9 when referring to certain element numbers. It will be further understood that, although the described method 800 identifies only two users, any number of additional users utilizing numerous other computing devices 140 with the same or varying display sizes could also participate in the comparison method 800 as shown and described herein.

In step 802 of method 800, the system application program 118 stored on the first user's device 106 commences operation as a result of the first user's haptic contact engagement with the application icon 706 initially displayed on the home screen display 702 of the first user's device 106.

In step 804 of method 800, the system application program 118 operating on the first user's device 106 identifies the dimensions of the first user's display, including the total pixel height in the Y direction 310 and total pixel width in the X direction 308 of the first user's device 106.

In step 806 of method 800, the system application program 118 operating on the first user's device 106 stores the first user's device 106 display dimension information in a memory storage component 224 of the first user's device 106.

In step 808 of method 800, the system application program 118 operating on the first user's device 106 accesses a digital media item 312, in this case a digital image 312, from the digital image library 218 on the first user's device 106. This access happens as a result of the first user's haptic contact engagement with the media item access module 726 displayed on the user interface 708 of the first user's device 106. It will be understood that the system application program 118 could also capture a digital video, or any other captured media item 312, as a result of the first user's haptic contact engagement on the media item capture module 724 located on the user interface 708 of the first user's device 106.

In step 810 of method 800, the system application program 118 operating on the first user's device 106 displays the media item 312 on the first user's device display. It will be understood that such display happens as a result of the first user's haptic selection of a media item 312 through the media item access module 726 or media item capture module 724.

In step 812 of method 800, the system application program 118 operating on the first user's device 106 awaits the first user's position-of-interest 316 information and text information to be provided by the first user's haptic contact engagement with a position-of-interest 316 on the display and text input entered in the text input module 738.

In step 814 of method 800, the system application program 118 operating on the first user's device 106 identifies the first user's position-of-interest 316 coordinate information.

In step 816 of method 800, the system application program 118 operating on the first user's device 106 stores the first user's position-of-interest 316 information on the first user's device 106. It will be understood that this information is stored on the first user's device 106 in terms of the total number of pixels in the X direction 318, and total number of pixels in the Y direction 320.

In step 818 of method 800, the system application program 118 operating on the first user's device 106 generates an $X_{ratio}$ 338 and $Y_{ratio}$ 330 for the first user's particular position-of-interest 316 based on the display size of the first user's device. It will be understood that the system application program 118 generates the $X_{ratio}$ and $Y_{ratio}$ for the first user as follows:

$$X_{ratio} = \frac{\text{(first user selected pixels in the } X \text{ direction 318)} \div}{\text{(total pixel width 308 of display)}}$$

-continued $$Y_{ratio} = \frac{\text{(first user selected pixels in the } Y \text{ direction 320)} \div}{\text{(total pixel height 310 of display)}}$$

In step 820 of method 800, the system application program 118 operating on the first user's device 106 creates a composite media item 500. The composite media item at this stage is comprised of the first (sending) user's unique device identifier 502, $X_{ratio}$ 328 and $Y_{ratio}$ 330 data 506, and text 504 contained in the text input module 738, all in association with the media item 312.

In step 822 of method 800, the system application program 118 operating on the first user's device 106 calculates an area-of-interest 322 with an $X_{indicator}$ of 50 pixels and a $Y_{indicator}$ of 50 pixels concentrically surrounding the first user's position-of-interest 316.

In step 824 of method 800, the system application program 118 operating on the first user's device 106 identifies a second user of the system 100 as a result of the first user's haptic contact engagement with the user selection module 750 shown on the user interface 708 of the first user's device 106.

In step 826 of method 800, the system application program 118 operating on the first user's device 106 transmits the composite media item 500 to the media server 124 over the wide area network 116 as a result of the first user's haptic contact engagement with the user send module 746.

In step 828 of method 800, the system application program 118 operating on the second user's device 110 accesses user information from the authorization server 120 to determine whether the second user is authorized to receive information relating to the composite media item 500 sent by the first user.

In step 830 of method 800, the system application program 118 operating on the first user's device 106, determines whether the second user is authorized to receive any information contained the composite media item 500. If the second user is authorized, the method 800 continues with respect to the second user. If the second user is not authorized, the method 800 concludes with respect to the second user and the second user does not utilize the system 100 with respect to that composite media item 500.

In step 832 of method 800, the system application program 118 operating on the second user's device 110 identifies the dimensions of the second user's display, including the total pixel height 310 and pixel width 308 of the second user's device 110.

In step 834 of method 800, the system application program 118 operating on the second user's device 110 stores the second user's device display dimension information in a memory storage component 224 of the second user's device 110.

In step 836 of method 800, the system application program 118 operating on the second user's device 110 displays the media item 312 and text information 504 to the second user through the display of the second user's device 110. The first user's position-of-interest 316 and area-of-interest 322 overlay are not shown to the second user at this time.

In step 838 of method 800, the system application program 118 awaits the second user's input of the second user's position-of-interest 316.

In step 840 of method 800, the system application program 118 operating on the second user's device 110 identifies the second user's position-of-interest 316 coordinate information in terms of the total number of pixels in the X direction 318, and total number of pixels 320 in the Y direction.

In step 842 of method 800, the system application program 118 operating on the second user's device 110 stores the second user's position-of-interest 316 on the second user's device 110. It will be understood that the second user's position-of-interest information was stored on the second user's device 110 as a result of the second user's haptic contact engagement with the display of the second user's device 110 indicating the second user's interest regarding a location on the media item 312.

In step 844 of method 800, the system application program 118 operating on the second user's device 110 generates an $X_{ratio}$ and $Y_{ratio}$ for the second user's particular position-of-interest 316 based on the display size of the second user's device. It will be understood that the system application program 118 generates the $X_{ratio}$ and $Y_{ratio}$ for the second user as follows:

$$X_{ratio} = \frac{\text{(second user selected pixels in the } X \text{ direction 318)} \div}{\text{(total pixel width 308 of display)}}$$

$$Y_{ratio} = \frac{\text{(second user selected pixels 304 in the } Y \text{ direction 320)} \div}{\text{(total pixel height 310 of display)}}$$

In step 846 of method 800, the system application program 118 operating on the second user's device 110 multiplies the $X_{ratio}$ for a given media item by the total display width 308 of the second user's device 110. Similarly, the system application multiplies the $Y_{ratio}$ for the media item by the total display height 310 of the second user's device 110. The resulting dimensions are the normalized position-of-interest coordinates $X_{normalized}$ and $Y_{normalized}$ as applied to the second user's device, allowing the first user's position-of-interest 316 to be properly identified in proportion to the second user's display. The equations are simplified as follows:

$$X_{normalized} = \text{(first user } X_{ratio}\text{)} \times \text{(total second user device display width 308)}$$

$$Y_{normalized} = \text{(first user } Y_{ratio}\text{)} \times \text{(total second user device display height 310)}$$

In step 848 of method 800, the system application program 118 operating on the second user's device 110 determines if the second user's normalized position-of-interest 316 is within the first user's area-of-interest 322, where the first user's area-of-interest is defined by the $X_{indicator}$ 324 and $Y_{indicator}$ 326 surrounding the $X_{normalized}$ and $Y_{normalized}$ coordinates as shown on the second user's display. This determination is found by the following operation:

Nomenclature $X_1 = X_{normalized}$
$Y_1 = Y_{normalized}$
$X_2$ = second user selected position-of-interest in X direction 318
$Y_2$ = second user selected position-of-interest in Y direction 320
$A = (X_{indicator}\ \mathbf{324})/2$
$B = (Y_{indicator}\ \mathbf{326})/2$ Decision Operation If $(X_1 - A) < X_2 < (X_1 + A)$
AND If $(Y_1-B)<Y_2<(Y_1+B)$
  THEN
  RETURN: "CORRECT POSITION"
  ELSE
  RETURN: "INCORRECT POSITION"

In step 850 of method 800, the system application program 118 operating on the second user's device 110 alerts the second user regarding the result of the operation conducted in step 848. If the second user's position-of-interest is within the first user's area-of-interest 322 then the second user receives an alert 772 such as "Correct!" Similarly, if the second user's position-of-interest is not within the first user's area-of-interest 322 then the second user receives an alert 772 such as "Incorrect." It will be understood that any number of other textual or other messages could be generated from the result of this operation.

In step 852 of method 800, the system application program 118 operating on the second user's device 110 transmits the second (receiving) user's $X_{ratio}$ 328 and $Y_{ratio}$ 330 data 510 and unique device identifier 508 information to the media server 124 over the wide area network 102 in association with the media item 312.

In step 854 of method 800, as a result of the transmission in step 852, the composite media item 500 stored on the media server 124 is updated with the second user's $X_{ratio}$ 328 and $Y_{ratio}$ 330 data 510 and unique device identifier 508.

In step 856 of method 800, the system application program 118 operating on the second user's device 110 displays the comparison of each user's position-of-interest 316. It will be understood that such results can be displayed and "replayed" on each user's device including, but not limited to, in a manner as shown and described in relation to FIG. 6.

Figure 9A:
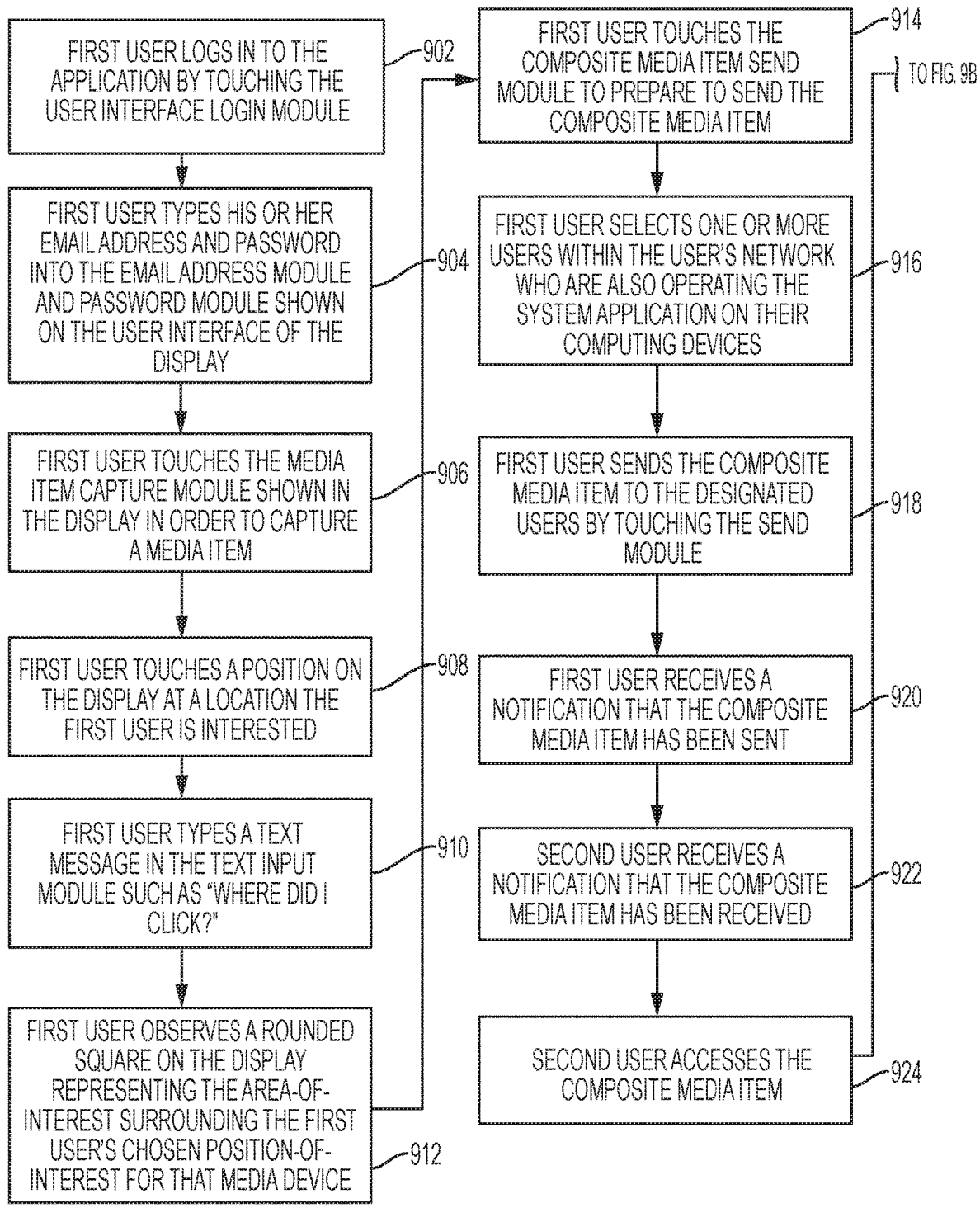
FIG. 9A illustrates, from the perspective of one or more users of the system, a method of comparing respective positions of interest on media items among users of the system, as shown and described herein.
Figure 9B:
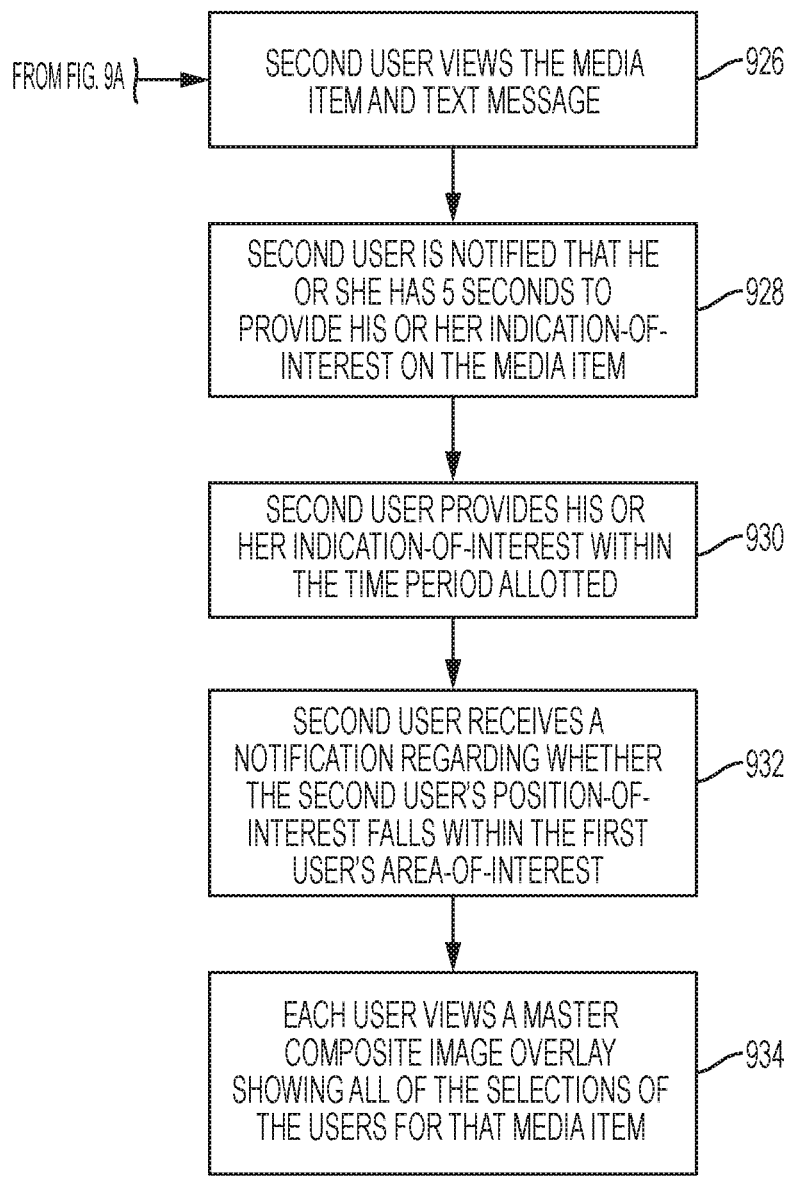
FIG. 9B further illustrates, from the perspective of one or more users of the system, a method of comparing respective positions of interest on media items among users of the system, as shown and described herein.

Referring now to FIGS. 9A and 9B, another embodiment of a position-of-interest on media item comparison method 900 is shown. In this embodiment, the method is described from the perspective of the user interface of a first (sending) user and second (receiving) user of the method 900.

In this embodiment, it will be understood that the first user utilizes a mobile device 106 and the second user utilizes a tablet device 110, with each device having a different respective screen size. It will be further understood that although the described method 900 identifies only two users, any number of additional users utilizing numerous other computing devices 140 could also participate in the comparing method 900 as shown and described herein. It will be further understood that the described method will refer to various system 100 components described herein and presented in the figures contained herein.

In step 902 of method 900, the first user logs in to the application 118 by touching the login module 712.

In step 904 of method 900, the first user types his or her email address and password into the email address module 718 and password module 720 shown on the user interface of the display.

In step 906 of method 900, the first user touches the media item capture module 724 shown in the display in order to capture a media item 312.

In step 908 of method 900, the first user touches a position on the display at a location the first user finds interesting. In this case, an umbrella shown on the media item 312.

In step 910 of method 900, the first user types a text message in the text input module 738 such as "where did I click?"

In step 912 of method 900, the first user observes a rounded square 744 on the display representing the area-of-interest 322 surrounding the first user's chosen position-of-interest 316 on that media item 312.

In step 914 of method 900, if the first user is satisfied with his or her choice of position-of-interest 316, the first user touches the composite media item send module 745 to prepare to send the composite media item 332 to the media server 124 for ultimate participation by other users of the system 100.

In step 916 of method 900, the first user selects one or more users 750 within the user's network who are also operating the system application program 118 on their computing devices 140 and may wish to receive the first user's composite media item 322 information.

In step 918 of method 900, the first user sends the composite media item to the designated users by touching the send module 746.

In step 920 of method 900, the first user receives a notification 752 that the composite media item has been sent.

In step 922 of method 900, the second user receives notification that the first user shared a composite media item to be compared.

In step 924 of method 900, the second user accesses the composite media item.

In step 926 of method 900, the second user views the media item and text message. The second user is intentionally prevented from viewing the first user's position-of-interest or area-of-interest information for that media item.

In step 928 of method 900, the second user is notified that he or she has 5 seconds to provide his or her position-of-interest on the media item. If the second user does not react within the time provided, the operation fails and the second user is notified that he or she has failed to react in time.

In step 930 of method 900, the second user provides his or her position-of-interest within the time period allotted.

In step 932 of method 900, the second user receives a notification 770 regarding whether the second user's position-of-interest falls within the first user's area-of-interest. If the second user's position-of-interest falls within the first user's area-of-interest the alert states "you clicked right." If not, the alert states you "you clicked wrong." It will be understood that any number of messages could be provided in addition to the example messages as provided herein.

In step 934 of method 900, each user views a composite image overlay showing all of the selections of the users for that media item. This overlay can be displayed in any number of ways, including as described and shown relating to FIG. 6.

It will be understood that the systems, methods, and devices described herein have the general ability to: embed within various mobile web browsers such as Safari®, Google Chrome®, Firefox® in the form of a website. In addition, the systems, methods, and devices described herein have the general ability to exist in website format presented inside of social media web browsers embedded inside platforms such as, but not limited to, Facebook®, Instagram®, Pinterest®, Snapchat® and other social media platforms where users are already connected to one another over a wide area network.

It will be understood that the first user, and all other users of the system (which can be plentiful) will have the same ability to send and receive composite media items and related information in the same manner described above with respect to the second user, and vice-verse.

It will be understood that haptic contact engagement is not required for a user to provide input in any of the systems and methods as described herein. Such user selection can be accomplished through control of a computer mouse, keyboard, remote control, foot pedal, voice command, or other methods by which a device allows a user to provide user input.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A non-transient computer readable storage medium configured to store one or more sets of instructions which, when executed by a processor, cause said processor to:
   access a media item from a first memory component of a first computing device;
   identify a first position-of-interest on said media item based on input from said first computing device;
   display said media item;
   receive information identifying a second position-of-interest on said media item from a second computing device;
   generate an area-of-interest surrounding said first position-of-interest;
   compare said second position-of-interest with said area-of-interest to determine whether said second position-of-interest is within said area-of-interest; and
   display a result of said comparison of said second position-of-interest with said area-of-interest to determine whether said second position-of-interest is within said area-of-interest.

2. The computer readable storage medium of claim 1, further comprising instructions which, when executed by said processor, cause said processor to:
   receive information identifying a third position-of-interest on said media item from a third computing device; and
   compare said third position-of-interest with said area-of-interest to determine whether said third position-of-interest is within said area-of-interest.

3. The computer readable storage medium of claim 1, wherein said second position-of-interest is normalized to dimensions of a display of said first computing device.

4. The computer readable storage medium of claim 1, wherein said information identifying said second position-of-interest on said media item from said second computing device further includes composite information including one or more of a text string associated with said second position-of-interest and a device identifier for said second computing device.

5. The computer readable storage medium of claim 1, further comprising instructions which, when executed by said processor, cause said processor to overlay a visual representation of said second position-of-interest with said display of said media item.

6. The computer readable storage medium of claim 2, further comprising instructions which, when executed by said processor, cause said processor to overlay a visual representation of said second position-of-interest and said third position-of-interest with said display of said media item, wherein the visual representation of said second position-of-interest is overlaid a preconfigured amount of time prior to the visual representation of said third position-of-interest.

7. The computer readable storage medium of claim 1, wherein comparing said second position-of-interest with said area-of-interest to determine whether said second position-of-interest is within said area-of-interest comprises determining whether an x-coordinate of said second position-of-interest is within a first region and determining whether a y-coordinate of said second position-of-interest is within a second region, wherein said first region and said second region are based on said area-of-interest.

8. The computer readable storage medium of claim 1, wherein displaying a result of said comparison of said second position-of-interest with said area-of-interest to determine whether said second position-of-interest is within said area-of-interest comprises:
   showing an alert window alerting a user of said first computing device whether said second position-of-interest is within said area-of-interest.

9. The computer readable storage medium of claim 1, wherein generating an area-of-interest surrounding said first position-of-interest comprises forming an overlay by calculating a first predetermined pixel distance $X_{indicator}$ from said first position-of-interest in a first direction and calculating a second predetermined pixel distance $Y_{indicator}$ from said first position-of-interest in a second direction.

10. The computer readable storage medium of claim 1, further comprising instructions which, when executed by said processor, cause said processor to send a notification to said second computing device regarding whether said second position-of-interest is within said area-of-interest.

11. The computer readable storage medium of claim 5, wherein:
   identifying a first position-of-interest on said media item based on input from said first computing device occurs prior to receiving information identifying a second position-of-interest on said media item from a second computing device, and without displaying said information identifying a second position-of-interest, and
   overlaying a visual representation of said second position-of-interest with said display of said media item occurs after comparing said second position-of-interest with said area-of-interest to determine whether said second position-of-interest is within said area-of-interest.

12. The computer readable storage medium of claim 1, wherein identifying the first position-of-interest on said media item based on input from said first computing device occurs without displaying said second position-of-interest.

13. The computer readable storage medium of claim 1, wherein said information identifying said second position-of-interest is received from said second computing device within a preconfigured time limit based on when identifying the first position-of-interest occurred.

14. The computer readable storage medium of claim 6, further comprising instructions which, when executed by said processor, cause said processor to re-play said overlaying a visual representation of said second position-of-interest and said third position-of-interest with said display of said media item, wherein the visual representation of said second position-of-interest is overlaid a preconfigured amount of time prior to the visual representation of said third position-of-interest.

15. A method comprising:
   accessing a media item from a first memory component of a first computing device;
   identifying a first position-of-interest on said media item based on input from said first computing device;
   displaying said media item;
   receiving information identifying a second position-of-interest on said media item from a second computing device;
   generating an area-of-interest surrounding said first position-of-interest;

comparing said second position-of-interest with said area-of-interest to determine whether said second position-of-interest is within said area-of-interest; and displaying a result of said comparison of said second position-of-interest with said area-of-interest to determine whether said second position-of-interest is within said area-of-interest.

16. The method of claim 15, further comprising:

receiving information identifying a third position-of-interest on said media item from a third computing device; and comparing said third position-of-interest with said area-of-interest to determine whether said third position-of-interest is within said area-of-interest.

17. The method of claim 15, wherein said information identifying said second position-of-interest on said media item from said second computing device further includes composite information including one or more of a text string associated with said second position-of-interest and a device identifier for said second computing device.

18. The method of claim 15, wherein said second position-of-interest is normalized to dimensions of a display of said first computing device.

19. The method of claim 15, further comprising overlaying a visual representation of the second position-of-interest with the display of said media item.

20. The method of claim 16, further comprising overlaying a visual representation of said second position-of-interest and said third position-of-interest with said display of said media item.

21. The method of claim 15, wherein comparing said second position-of-interest with said area-of-interest to determine whether said second position-of-interest is within said area-of-interest comprises determining whether an x-coordinate of said second position-of-interest is within a first region and determining whether a y-coordinate of said second position-of-interest is within a second region, wherein said first region and said second region are based on said area-of-interest.

22. A mobile device comprising:
a processor;
a display;
a media capture controller;
a media library storage component;
an image capturing sensor to capture a media item;
a touch sensor to receive haptic input from a user; and
an interest-comparing application executable on said device which, when executed, causes said mobile device to:
access a media item from said media library storage component;
display said media item;
identify a first position-of-interest on said media item based on input from said touch sensor;
receive information identifying a second position-of-interest on said media item from a second computing device;
generate an area-of-interest surrounding said first position-of-interest;
compare said second position-of-interest with said area-of-interest to determine whether said second position-of-interest is within said area-of-interest; and
display a result of said comparison of said second position-of-interest with said area-of-interest to determine whether said second position-of-interest is within said area-of-interest.

23. The mobile device of claim 22, wherein said interest-comparing application, when executed, further causes said mobile device to:
receive information identifying a third position-of-interest on said media item from a third computing device; and
compare said third position-of-interest with said area-of-interest to determine whether said third position-of-interest is within said area-of-interest.

24. The mobile device of claim 22, wherein said information identifying said second position-of-interest on said media item from said second computing device further includes composite information including one or more of a text string associated with said second position-of-interest and a device identifier for said second computing device.

25. The mobile device of claim 22, wherein said interest-comparing application, when executed, further causes said mobile device to overlay a visual representation of said second position-of-interest with said display of said media item.

26. The mobile device of claim 23, wherein said interest-comparing application, when executed, further causes said mobile device to overlay a visual representation of said second position-of-interest and said third position-of-interest with said display of said media item.

27. The mobile device of claim 22, wherein comparing said second position-of-interest with said area-of-interest to determine whether said second position-of-interest is within said area-of-interest comprises determining whether an x-coordinate of said second position-of-interest is within a first region and determining whether a y-coordinate of said second position-of-interest is within a second region, wherein said first region and said second region are based on said area-of-interest.

* * * * *